Feb. 3, 1925.
T. F. MEINHARDT ET AL
ELECTRIC HEATER
Filed April 8, 1924
1,524,993
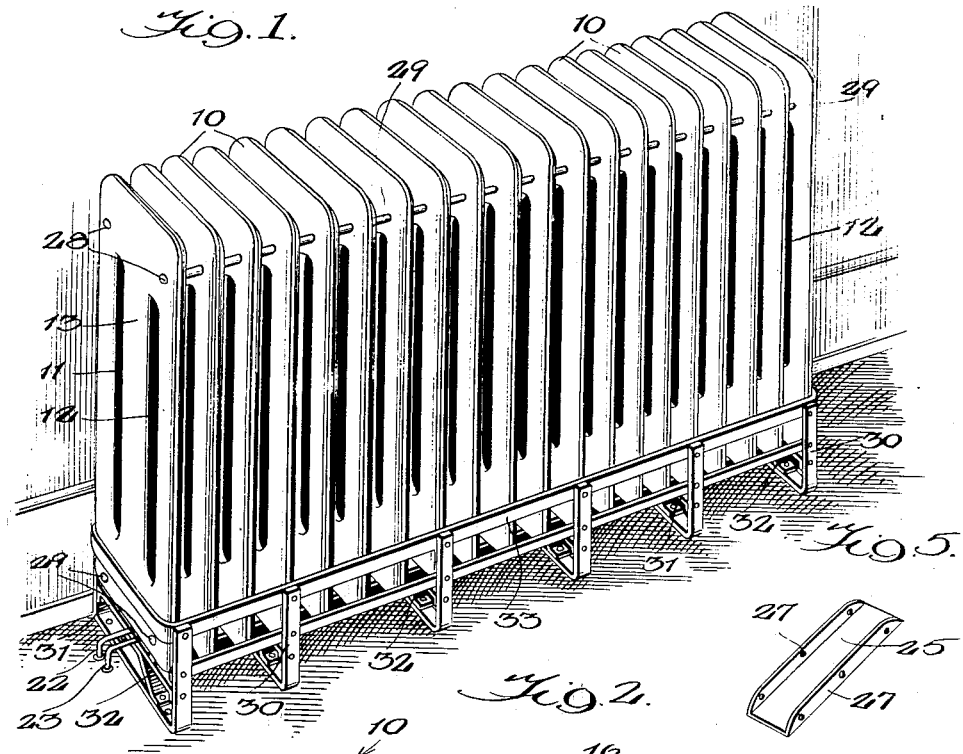
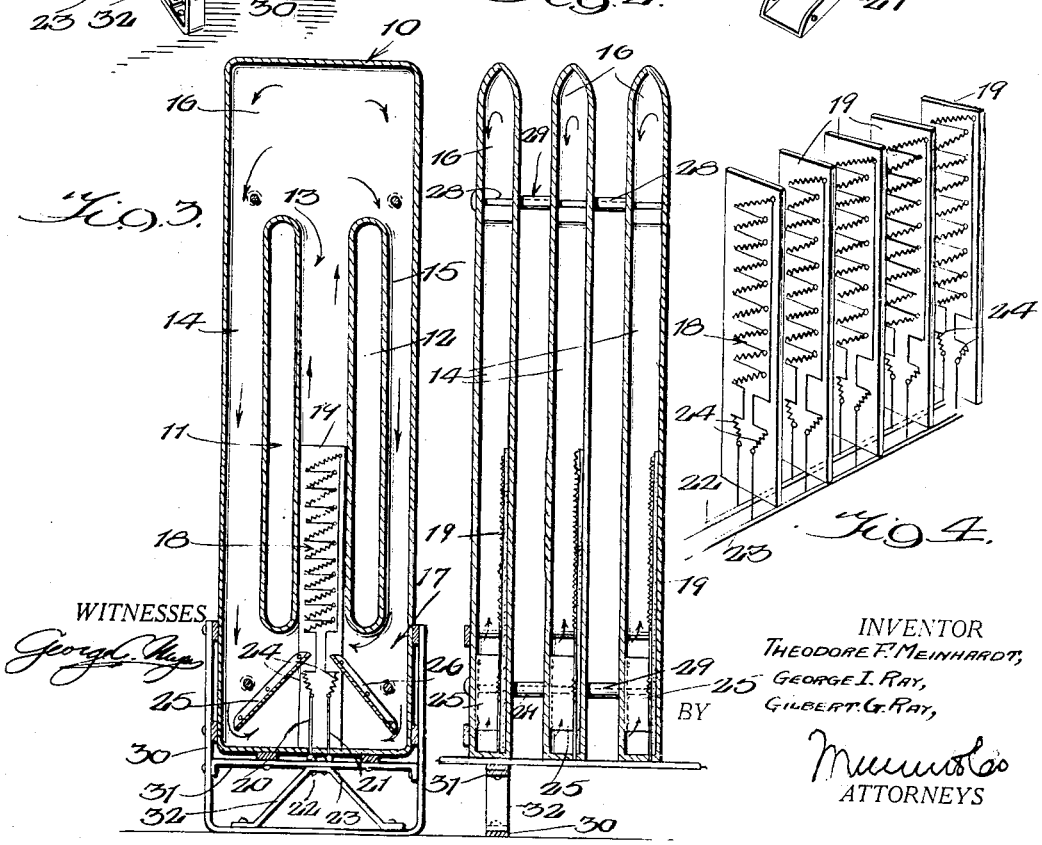
INVENTOR
THEODORE F. MEINHARDT,
GEORGE I. RAY,
GILBERT G. RAY,
BY
ATTORNEYS Patented Feb. 3, 1925.

1,524,993

UNITED STATES PATENT OFFICE.

THEODORE F. MEINHARDT, GEORGE I. RAY, AND GILBERT G. RAY, OF CHARLOTTE, NORTH CAROLINA.

ELECTRIC HEATER.

Application filed April 8, 1924. Serial No. 705,153.

*To all whom it may concern:*

Be it known that we, THEODORE F. MEINHARDT, GEORGE I. RAY, and GILBERT G. RAY, citizens of the United States, and residents of Charlotte, in the county of Mecklenburg and State of North Carolina, have invented certain new and useful Improvements in Electric Heaters, of which the following is a specification.

Our present invention relates generally to electrical heaters and the like, and more particularly to electrical heaters wherein the heating coil or other element is disposed within a current of air, our object being the provision of a heater of this general type in which the heated air and heated element are within a closed casing and wherein the arrangement is such that a unit construction results which is capable of use in duplicate or multiple form depending upon the amount of heat required.

More particularly our invention proposes the use of a closed casing in the general form of one of the coils or sections of a steam or hot water radiator, this casing being arranged to provide upper and lower chambers of considerable proportions, within the former of which the heated air dissipates its heat through the wall of the casing to the surrounding air, these chambers being connected by virtue of the arrangement of the casing to include central and side air passages communicating between the chambers, of which the central air passage receives partially therein the heating coil or element arranged in the lower chamber along with certain other features whose purpose is to augment the circulation of air between the chambers through the said air passages.

In the accompanying drawing which illustrates our present invention and forms a part of this specification, Figure 1 is a perspective view illustrating the practical application of our invention in multiple form, Figure 2 is an enlarged vertical section taken centrally and longitudinally through a portion of the heater shown in Figure 1, Figure 3 is a vertical transverse section taken through one of the casings, Figure 4 is a detail perspective view of a series of connected heating elements for the adjacent units of a multiple unit heater, and Figure 5 is a detail perspective view of one of the baffle members removed.

Referring now to these figures and particularly to Figure 3 we have shown an electrical heater of unit form including a generally rectangular casing 10 which in use stands in upright position and is preferaby formed of sheet metal so as to provide thin walls through which the internal constantly heated and circulated air may readily dissipate its heat to the exterior of the casing as desired. This casing is formed with vertically slotted openings 11 and 12 at opposite sides of its center, dividing the same into a central air passage 13 between the two openings and side air passages 14 and 15 at opposite sides of the two openings. These air passages of which the central passage 13 provides for the upward movement of air and the side passages 14 and 15 provide for the downward movement of air, communicate between upper and lower chambers 16 and 17, the former of which in particular is of considerably greater dimensions than that of the usual radiator section or coil, in order to provide ample radiation surface for the heated air which rises through the central air passage 13 and which when its heated air has been dissipated travels downwardly through the side passages 14 and 15 to the lower chamber 17.

Within the lower chamber and at one side thereof there is mounted a heating element or coil whose body portion 18 rises within the lower portion of the central air passage 13, this coil being mounted in connection with an asbestos or other support 19 and including within the chamber 17 a pair of leads 20 and 21 extending through the base of the casing 10 for connection with feed wires 22 and 23.

The heating element also includes within the lower chamber 17 an intensifying coil 24 at approximately the center of the lower chamber below the upper inner spaced apart ends of a pair of inclined baffle plates or members 25 and 26, one of which is shown in Figure 5. Each of these baffle members has flanged sides 27 by means of which it is secured to the side walls of the casing as by means of riveting and it will be noted that the lower outer ends of these baffle members are spaced from the base and sides of the casing while the upper ends thereof are not only spaced from one another upon opposite sides of the vertical center of the casing but are also spaced from the lower end walls of the openings 11 and 12. Thus it is obvious that the lower ends of the side air passages 14 and 15 are in communication with the lower end of the central air passage 13 through the spaces above the baffle members 25 and 26 and are also in communication with the space between these baffle members in which the intensifying coil 24 is included, that portion of the downward air currents at the extreme outer sides of the passages 14 and 15 passing downwardly around the lower ends of the baffle members 25 and 26 within the influence of the intensifying coil 24 past which these currents move through the space between the upper ends of the baffle members and into the lower end of the central passage 13 so as to create a suction in the lower portion of the central passage which draws that portion of the air currents along the inner sides of the passages 14 and 15 directly into the influence of the upper heating coil 18 and directly into the lower end of the central passage 13 so as to augment the normal circulation and increase efficiency thereof and of the heater as a whole.

It becomes obvious from the foregoing that a heater may be formed of one of the units just described or a series thereof connected for instance by bolts 28 as seen in Figure 2 and spaced apart as by means of thimbles 29 around the bolts between the casings of the several units, the feed wires 22 and 23 in this instance being along the bases of the several units for connection with the leads 20 and 21 of the several heating coils.

While our improved heater in either single or multiple units is capable of ready support in the relation above stated whereby the external air may freely circulate around all portions of the casing or casings and through the vertically slotted openings 11 and 12 thereof, we prefer to utilize a support which will hold the casing spaced above the floor or other supporting surface and we propose to utilize for this purpose a supporting frame essentially comprising a main U-shaped portion 30 having in its lower portion a rigid cross rail 31 spaced above the base of the frame 30 and connected to the latter by an interposed bracing member 32, the lower portion of the casing depending between the sides of the supporting frame 30 and supported upon the cross piece 31 or upon strips attached to this cross piece so that the lower end of the casing is thus elevated above the floor or other supporting surface. Where several units are utilized in multiple form to constitute a heater, lengthwise rails 33 are employed connecting the side portions of a series of U-shaped frames 30 for the above purpose.

We claim:

1. An electric heater consisting of a closed casing having upper and lower chambers therein and central and side passages respectively for the upward and downward movement of air between the chambers, and a heating element within the lower chamber having a coil extending upwardly into the lower portion of the central passage for continuously heating the air circulating between said chambers, said heating element also including an intensifying coil within the lower chamber and means whereby to bring a portion of the circulating air within the direct influence of the said intensifying coil.

2. An electric heater consisting of a closed casing having upper and lower chambers therein and central and side passages respectively for the upward and downward movement of air between the chambers, and a heating element within the lower chamber having a coil extending upwardly into the lower portion of the central passage for continuously heating the air circulating between said chambers, and an intensifying coil in the lower chamber and baffle members inclined upwardly and inwardly toward one another within the lower chamber having their lower outer ends spaced from the base of the casing and having their upper inner ends spaced apart below the lower end of the central passage and disposed at opposite sides of the said intensifying coil.

3. An electric heater consisting of a closed casing in the general form of a radiator section or coil having upper and lower chambers therein and central and side air passages communicating between said chambers, a pair of baffle members within the lower chamber inclined upwardly toward one another, having their lower outer ends spaced from the base of the casing and having their upper inner ends spaced apart below the lower end of the central passage, and a heating element upstanding through the lower chamber having an upper coil projecting into the lower portion of the central passage and having a lower intensifying coil between the said baffle members and below the upper ends thereof.

4. An electric heater consisting of a closed casing in the general form of a radiator section or coil having upper and lower air chambers and spaced apart vertically slotted openings therethrough dividing the same into central and side air passages communicating between said chambers, and an electrical heating element upstanding through the lower chamber including a coil projecting upwardly into the lower portion of the central chamber.

5. An electric heater consisting of a closed casing in the general form of a radiator section or coil having upper and lower air chambers and spaced apart vertically slotted openings therethrough dividing the same into central and side air passages communicating between said chambers, an electrical heating element upstanding through the lower chamber including a coil projecting upwardly into the lower portion of the central chamber, and means within the lower chamber, cooperating with a portion of said heating element for augmenting the flow of air from the lower portions of the side passages into the lower portion of the central passage as described.

THEODORE F. MEINHARDT.
GEORGE I. RAY.
GILBERT G. RAY.